United States Patent
Sands

Patent Number: 5,393,271
Date of Patent: Feb. 28, 1995

[54] QUICK CHANGE SPROKET

[76] Inventor: Steven R. Sands, 312 2nd Ave NE. Apt 4, Waseca, Minn. 56093

[21] Appl. No.: 189,962

[22] Filed: Feb. 2, 1994

[51] Int. Cl.⁶ ............................................. F16H 55/12
[52] U.S. Cl. ..................... 474/96; 474/162; 474/903
[58] Field of Search ............. 474/95, 96, 150, 152, 474/162, 165, 166, 198, 273, 903

[56] References Cited

U.S. PATENT DOCUMENTS

| | | | |
|---|---|---|---|
| 367,984 | 8/1887 | Lathrop et al. | 474/96 |
| 738,765 | 9/1903 | Boyce | 474/96 |
| 774,965 | 11/1904 | Davenport | 474/95 |
| 1,540,096 | 6/1925 | West | 474/96 X |
| 2,382,740 | 8/1945 | Noffsinger | 474/96 |
| 2,640,367 | 6/1953 | Rieser | 474/150 X |
| 3,083,585 | 4/1963 | Dawe et al. | 474/162 X |
| 3,429,008 | 10/1947 | Wolfe | 474/162 |
| 4,559,028 | 12/1985 | Reeves | 474/162 |
| 4,711,635 | 12/1987 | Arnce | 474/152 |
| 5,316,522 | 5/1944 | Carbone et al. | 474/903 X |

*Primary Examiner*—Roger J. Schoeppel

[57] ABSTRACT

A mounting method for split sprockets which embodies radial slots in all mounting bolt positions; except the two mounting bolt positions disected by the split ends of the sprocket, the aforementioned radial slots extending from the center bore outward to; and including all, remaining mounting bolt positions which allows removal and replacement to be accomplished in a rotatable fashion, replacement being further facilitated by orientation openings adjacent to a common sprocket split line, one in each sprocket half.

6 Claims, 1 Drawing Sheet

QUICK CHANGE SPROKET

1. Field of the Invention

The present invention relates to a mounting method which allows split sprockets to be mounted to, or dismounted from, a mounting member easier, and with a considerable time savings than has been previously possible.

2. Prior Art

Currently in use is a member mounted split sprocket which, when effecting the sprocket change, requires the complete removal of the attachment fasteners; followed by moving the sprocket halves away from the mounting member laterally until the sprocket halves clear the mounting member attachment bolts before complete dismounting can be accomplished. No method is known which allows the split sprocket to be removed and replaced without complete removal of the attachment fasteners. I have invented a method whereby the attachment fasteners only require loosening and then rotating the split sprocket halves up and away from the mounting member, quickly completing split sprocket removal. Reinstallation of a split sprocket is accomplished by rotating the split sprocket halves into position and re-tightening the previously loosened attachment fasteners.

SUMMARY OF THE INVENTION

The principal object of the present invention is to provide a split sprocket attachment method which causes split sprocket changes to be simple to complete and affords a substantial time savings over previous methods.

It is also an object of the present invention to provide such a system which is of simple, inexpensive manufacture.

Another object of the invention is to provide a means for instantly identifying the proper relationship of the split sprocket halves.

The foregoing objects can be accomplished by these improvements to the previous split sprocket mounting design.

In the preferred embodiment of the invention each split sprocket half is provided with two mounting holes, opposite from each other, and adjacent to the center bore, the centerlines of these holes being the split line of the sprocket halves resulting in one half mounting hole in each end of each sprocket half. Using the centerline of the split sprocket mounting hole in one end of one split sprocket half and the centerline of the split mounting hole in the opposite end of the other split sprocket half as centerpoints for radial slots which are provided from the remaining mounting hole positions in each split sprocket half, inward to, and opening on, the centerbore of the sprocket.

Proper alignment identification of the sprocket halves is achieved by the addition of two small openings, one in each sprocket half placed adjacent to a common split mounting hole.

DESCRIPTION OF THE PREFERRED EMBODIMENTS

Figure 1:
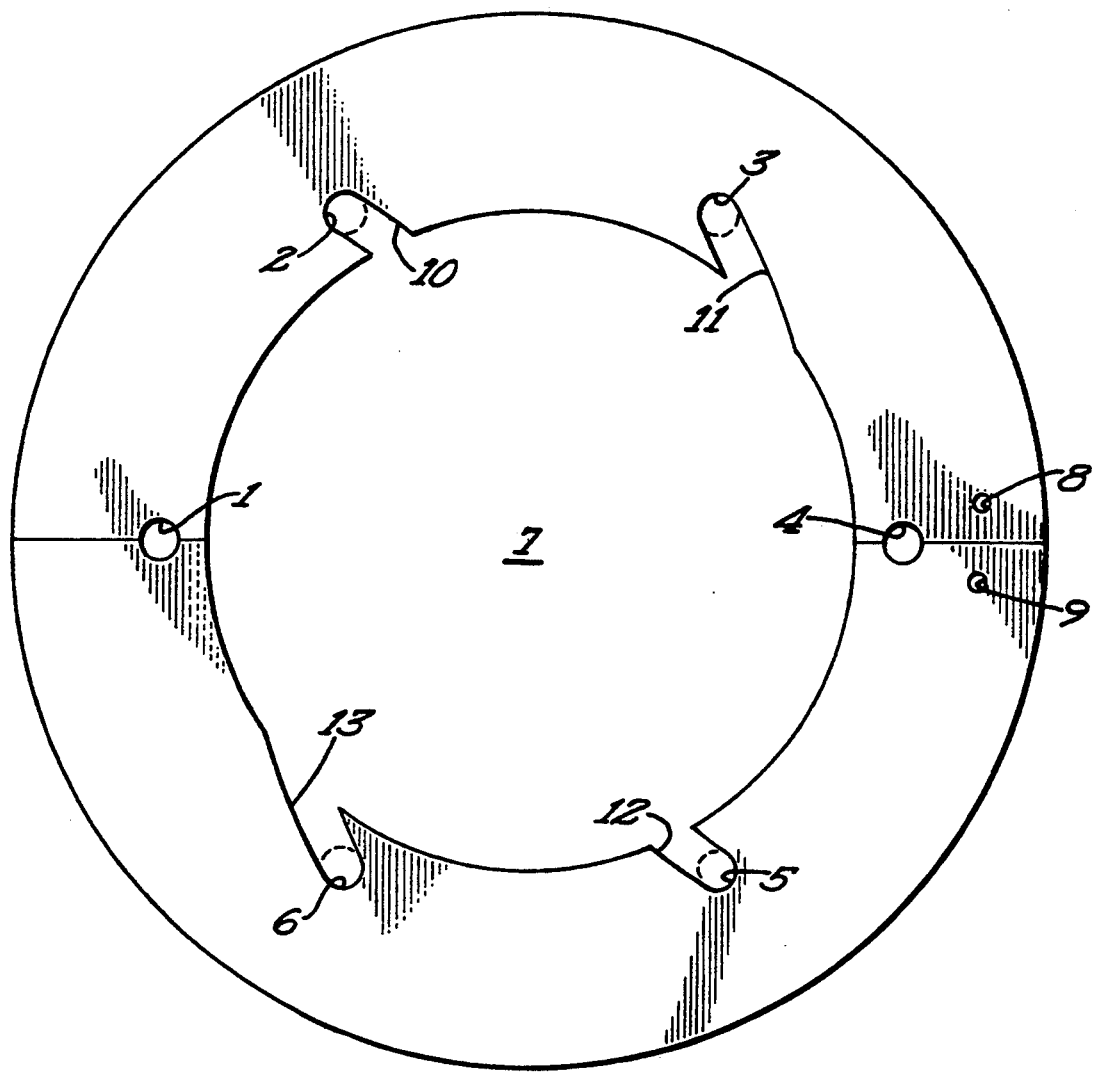
FIG. 1 is an elevated view of a split sprocket detailing the member mounting system and sprocket half orienting openings.

A split pulley having a center bore intended for member mounting is prepared in the following manner. Six mounting holes, numbered 1 through 6 (FIG. 1) are bored equally spaced from each other and adjacent to center bore 7 (FIG. 1).

In the embodiment shown, it will be seen that the mounting holes or apertures 1-6 are approximately 60 degrees apart. The mounting holes 1 and 4 are bisected by the diametrical split line 16 which equally divides the pulley 15 into pulley portions 17 and 18. It will be noted that a slot 10 intercommunicates the central bore 7 with the mounting or securing aperture 2, and that a slot 11 intercommunicates the mounting or securing hole 3 with the central bore 7.

It will further be noted that a slot 12 intercommunicates the mounting or securing hole 5 with the central bore 7 and, that a slot 13 intercommunicates the mounting or securing hole 6 with the central bore 7. The slots 10, 11, 12 and 13 are of arcuate configuration and permit the pulley portions 17 and 18 to be rotated or backed off when the fastening bolts are loosened.

The formation of these slots is a unique characteristic of this invention. Using the center point of mounting hole 1 as a reference point, the accruate slots 10 and 11 which have the same width as mounting hole 1 are milled or machined. It is pointed out that while the slots 10 and 11 have the width as the mounting hole 1, and the securing holes 2 and 3, the slots may have a different width. The radius used to machine or form the arcuate slot 10 is the distance between the center point of mounting hole 1 and the center point of securing hole 2. When the arcuate slot 10 is milled, the center point of mounting hole 1 is the reference point.

The radius used to form arcuate slot 11 is defined by the distance between the center point of mounting hole 1 and the center point of securing hole 3. It is again pointed out that the center point of mounting hole 1 is the reference point when the arcuate slot 11 is machined or milled.

The radius used to form slot 12 is defined by the distance between the center point of mounting hole 4 and the center point of securing hole 5. The center point of mounting hole 4 is the reference point when forming the arcuate slot 12. The radius for forming slot 13 is the distance from the center point of mounting hole 4 and the center point for securing hole 6. Again, the reference point for the formation of the arcuate slot 13 is the center point of mounting hole 4.

It will be noted that two small reference holes or apertures 8 and 9 are provided and each is located adjacent the mounting hole 4. In the embodiment shown, the reference hole 8 is located on the pulley portion 17 while the reference hole 9 is located on a pulley portion 18. These holes provide a visual means of properly orienting the sprocket halves 17 and 18.

I claim:

1. A split sprocket having two mounting apertures bisected by a sprocket split line and additional securing apertures for securing said sprocket to a shaft wherein the improvement comprises;

slotting of the securing apertures in a radial manner from a central bore outward to and including the locations of the securing apertures, the radius of the center line of each of said slots on one sprocket portion being determined by the distance from a center of a first mounting aperture to the respective securing aperture, and the radius of a center line of each of said slots on a second sprocket portion being determined by the distance from a center of the second mounting aperture to the respective securing aperture on said second sprocket portion.

2. The split sprocket of claim 1 wherein a reference aperture is provided on either side of a split sprocket mounting aperture.

3. The method of replacing the split sprocket as defined in claim 1 comprising the step of "loosening a securing means of a split sprocket assembly enabling each sprocket portion to be pivotally removeable from mounting on a shaft with the opposite procedure being used for rigidly attaching replacement sprocket portions to the shaft.

4. A split sprocket having a central bore and including a pair of sprocket portions defined by a sprocket split line, a pair of mounting apertures in said sprocket bisected by said sprocket split line, additional securing apertures in said sprocket portions for securing said sprocket to a shaft, arcuate slots in said sprocket portions, each slot intercommunicating a securing slot and said central bore, the radius of the center line of an arcuate slot in one sprocket portion being defined by the distance between the center of one mounting aperture to the center of the respective securing aperture in said one sprocket portion, and the radius of the center line of an arcuate slot in the other sprocket portion being defined between the center line of the other mounting aperture and the center of the respective securing aperture in said other sprocket portion.

5. A split sprocket having a central bore and including a pair of sprocket portions defined by a sprocket split line, a pair of mounting apertures in said sprocket bisected by said sprocket split line, a pair of securing apertures in each of said sprocket portions for securing said sprocket to a shaft, a pair of arcuate slots in each sprocket portion, each arcuate slot intercommunicating a securing aperture and said central bore, the radius of the center line of an arcuate slot in one sprocket portion being defined by the distance between the center of each respective mounting aperture in said one sprocket portion and the center of a respective securing aperture in said one sprocket portion, and the radius of the center line of an arcuate slot in the other sprocket portion being defined by the distance between the center of the other mounting aperture in said other sprocket portion and the center of each respective securing apertures in said other sprocket portion.

6. The split sprocket as defined in claim 5 and a pair of reference apertures disposed in closely spaced apart relation, one reference aperture being located in one of said sprocket portions, and the other reference aperture being located in the other sprocket portions.

* * * * *